US 11,657,478 B1
May 23, 2023

(12) United States Patent
Weingartner et al.

(54) SYSTEMS AND METHODS FOR DYNAMICALLY RENDERING THREE-DIMENSIONAL IMAGES WITH VARYING DETAIL TO EMULATE HUMAN VISION

(71) Applicant: Illuscio, Inc., Culver City, CA (US)

(72) Inventors: Mark Weingartner, Woodland Hills, CA (US); Tim Sung, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/048,343

(22) Filed: Oct. 20, 2022

Related U.S. Application Data

(63) Continuation of application No. 17/700,903, filed on Mar. 22, 2022, now Pat. No. 11,501,410.

(51) Int. Cl.
*G06T 15/00* (2011.01)
*G06T 3/40* (2006.01)

(52) U.S. Cl.
CPC ........... *G06T 3/4092* (2013.01); *G06T 15/00* (2013.01); *G06T 2210/36* (2013.01)

(58) Field of Classification Search
CPC ..... G06T 2210/36; G06T 15/00; G06T 15/06; G06T 15/20; G06T 15/405; G06T 3/4053; G06T 3/4092; G09G 2340/0407; G09G 2340/04; G09G 3/003; G09G 2340/0428; G09G 5/391; G06F 3/012; G06F 3/013
See application file for complete search history.

(56) References Cited

U.S. PATENT DOCUMENTS

| | | | |
|---|---|---|---|
| 2014/0247277 | A1 | 9/2014 | Guenter et al. |
| 2018/0275410 | A1* | 9/2018 | Yeoh ........................ G06F 3/013 |
| 2018/0288392 | A1 | 10/2018 | Hicks et al. |
| 2018/0299228 | A1 | 10/2018 | Naftel |
| 2019/0026874 | A1 | 1/2019 | Jin et al. |
| 2020/0043236 | A1* | 2/2020 | Miller ....................... G06F 1/163 |
| 2020/0349759 | A1 | 11/2020 | Baskinger |
| 2021/0152807 | A1* | 5/2021 | Hamilton ................ G06T 15/06 |

\* cited by examiner

*Primary Examiner* — Hau H Nguyen
(74) *Attorney, Agent, or Firm* — Ansari Katiraei LLP; Arman Katiraei; Sadiq Ansari

(57) ABSTRACT

Disclosed is a system and associated methods for dynamically rendering an image with varying detail that emulates human vision and that provides a dynamic resolution or level of detail at each layer of the image that is equal to or greater than the resolvable detail that can be detected by human vision within each layer. The system may adjust a non-linear function based on one or more of a display size, a display resolution, and a viewer distance from a display. The system may determine a dynamic resolution or level of detail for each layer of the image based on the adjusted non-linear function. The system may render the image data at or greater than the dynamic resolution or level of detail determined for each layer.

19 Claims, 7 Drawing Sheets

SYSTEMS AND METHODS FOR DYNAMICALLY RENDERING THREE-DIMENSIONAL IMAGES WITH VARYING DETAIL TO EMULATE HUMAN VISION

CLAIM OF BENEFIT TO RELATED APPLICATIONS

This application is a continuation of U.S. nonprovisional application Ser. No. 17/700,903 entitled "Systems and Methods for Dynamically Rendering Images of Three-Dimensional Data with Varying Detail to Emulate Human Vision", filed Mar. 22, 2022. The contents of application Ser. No. 17/700,903 are hereby incorporated by reference.

BACKGROUND

Frustum culling is a technique for reducing the resources and time needed to render an image. Frustum culling may involve determining what objects to render based on their position relative to the view frustum. Objects outside the view frustum are not rendered. Objects partially or wholly inside the view frustum are rendered.

Further efficiencies may be gained by rendering objects at a far plane of the view frustum at a lower resolution or with less detail than objects at a near plane of the view frustum. However, human vision does not resolve detail with such absolute delineations. Consequently, the rendered images, whether at full detail or at different levels of detail at the near and far planes, lack photorealism.

Foveated rendering is another technique that is intended to reduce rendering resources and time and to improve photorealism. Foveated rendering may involve decreasing the resolution or level of detail at the periphery of an image to mimic the lower detail at which human vision captures objects that are not directly focused on and in the periphery of the eye. Without continuous eye-tracking, foveated rendering may incorrectly render parts of the image that the eye is focused on. For instance, the eye may focus on objects in the periphery, and foveated rendering may render those objects at a lower resolution or detail than the center of the image that the user is not focused on. Foveated rendering is therefore another technique that produces unrealistic images when the viewer looks away from the center of the images.

DETAILED DESCRIPTION OF PREFERRED EMBODIMENTS

Figure 1:
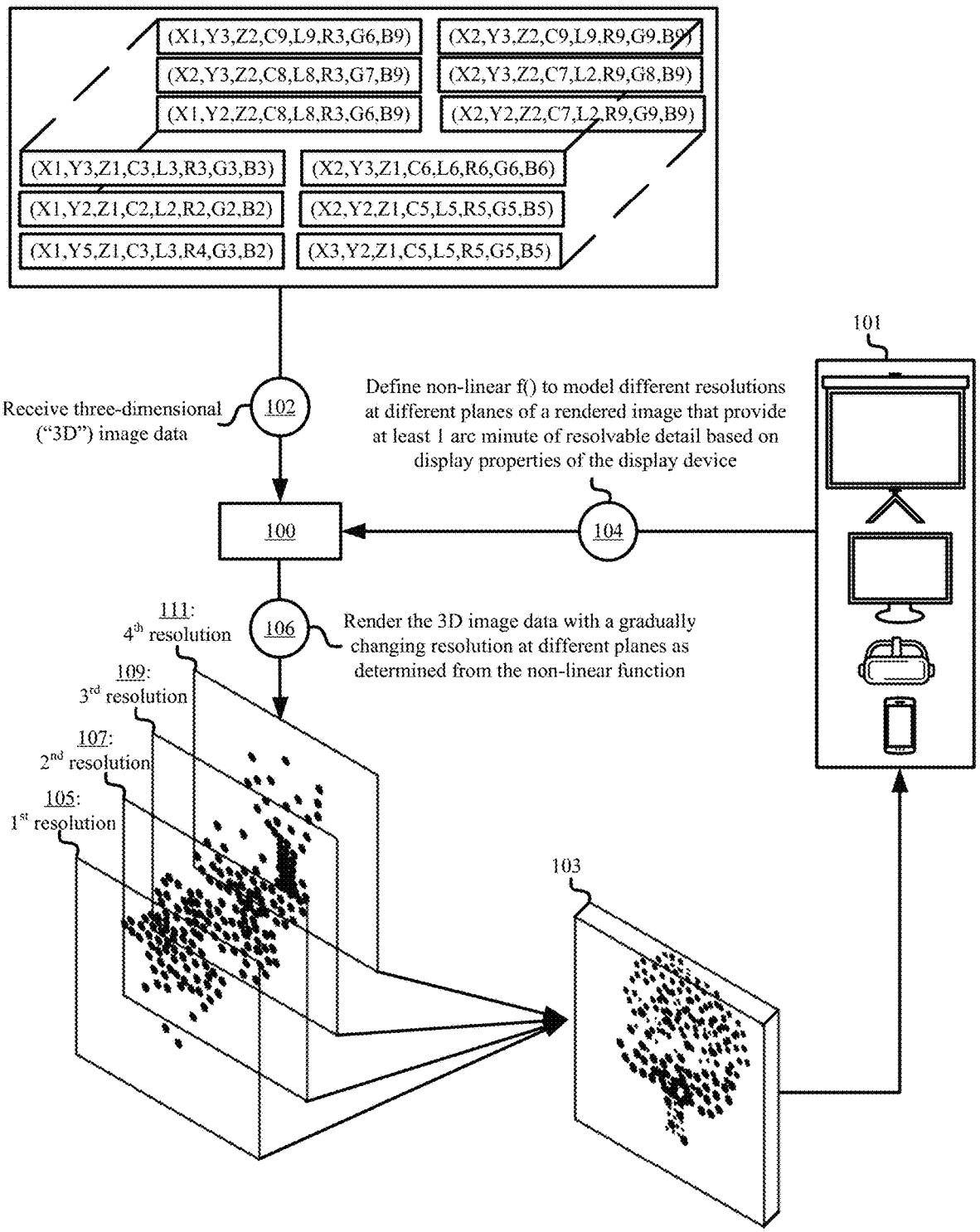
FIG. 1 illustrates an example of dynamically rendering objects within an image with varying detail to emulate human vision in accordance with some embodiments presented herein.

The following detailed description refers to the accompanying drawings. The same reference numbers in different drawings may identify the same or similar elements.

Provided are systems and methods for dynamically rendering images of three-dimensional ("3D") data or environments with varying detail to emulate human vision. The systems and methods may gradually reduce the resolution or level of detail for the objects rendered in an image in a manner consistent with the gradual reduction of the resolvable detail by human vision. By gradually reducing the resolution or level of detail in the rendered images according to the decrease in resolvable detail by human vision, the systems and methods may generate photorealistic images while reducing the processing resources and time that would otherwise be required when rendering the same images at full detail or with all data.

In some embodiments, a rendering system may model the gradual reduction of the resolvable detail by human vision using a tangent function, gradient function, smooth curve function, trigonometric function, and/or other non-linear function. Specifically, the rendering system may use the non-linear function to emulate the operation of human vision and/or to compute the varying resolvable resolution of human vision for different objects within a 3D space or 3D environment. The rendering system may use the non-linear function to determine the resolution and/or level of detail at which to render different depths or planes of an image. The rendering system therefore does not rely on static or absolute delineations (e.g., the near plane versus the far plane of the view frustum) to render objects at different depths of the view frustum with arbitrary resolutions or levels of detail that have little or no correlation to human vision. Moreover, rendering images of 3D data using the non-linear function may produce more accurate and photorealistic images than foveated rendering techniques that may incorrectly lower the resolution at different geographic regions of the image.

In some embodiments, the rendering system may define the non-linear function based on the display resolution, the size of the display, the distance of the viewer from the display, and/or the positioning of the objects within the 3D space or 3D environment. In other words, the rendering system may dynamically adjust and render the same image differently (e.g., with different resolutions at different depths or planes) on displays or devices with different display resolutions, display sizes, and/or viewer distances.

Human vision (e.g., 20/20 vision) has visual acuity of about one arc minute or 1/60th of a degree. This is the measure by which the human eye can detect a gap in a line as long as that gap is at least one arc minute. Objects rendered with resolutions and/or levels of detail that exceed one arc minute may contain extraneous detail that is not discernable by human vision. In other words, a first line rendered with a first resolution of one arc minute and a second line rendered with a second resolution greater than one arc minute will appear the same despite the system having to process more data to render the second line at the second resolution than the first line at the first resolution. Objects rendered with resolutions and/or levels of detail less than one arc minute may contain gaps, breaks, aliasing, and/or other discontinuities that are discernable by human vision.

The rendering system may define and/or use a non-linear function that maps and/or computes the visual acuity of human vision at different depths and/or planes in an image by accounting for the display resolution, the size of the display, the distance of the viewer from the display, and/or the positioning of the objects within the 3D space or 3D environment. Specifically, the non-linear function may determine the varying resolution or level of detail for objects distributed across a 3D space or 3D environment so that the objects are rendered with a resolution or level of detail of at least one arc minute.

FIG. 1 illustrates an example of rendering system 100 dynamically rendering objects within an image with varying detail to emulate human vision in accordance with some embodiments presented herein. Rendering system 100 may receive (at 102) a file containing data for one or more objects in a 3D environment. For instance, the file may contain data for a point cloud.

A point cloud may represent the 3D environment with a set of data points positioned within a 3D space. Each data point may capture the positioning and coloring of a different surface, feature, article, or object from the 3D environment at a corresponding point in the 3D space. Accordingly, each data point may include positional elements and non-positional elements.

The positional elements may include coordinates within the 3D space. For instance, each point cloud data point may include x-coordinate, y-coordinate, and z-coordinate elements to capture the position of an imaged surface, feature, article, or object from 3D environment at a corresponding position in the 3D space.

The non-positional elements may include information about the detected characteristics of the surface, feature, article, or object imaged at a corresponding position in the 3D space. This may include visual and non-visual characteristics of the corresponding surface, feature, or article.

In some embodiments, the characteristics represented by the non-positional elements may correspond to a detected color. The color may be represented using red, green, blue ("RGB"), and/or other values. In some embodiments, the characteristics represented by the non-positional elements may provide the chrominance and/or luminance of the imaged surface, feature, article, or object. In some embodiments, the characteristics may be related to properties of the device used to generate each of data points. For instance, the characteristics may include a Tesla strength value to quantify the strength of the magnetic field that was used in detecting and/or imaging the surface, feature, article, or object represented by a particular point cloud data point. In some embodiments, the non-positional elements may include energy, audio or sound, and/or other characteristics of the device or the object being imaged. Accordingly, the non-positional elements can include any property of the imaged surface, feature, article, or object (e.g., hue, saturation, brightness, reflectivity, etc.), or of the device used to capture the object part at a corresponding data point in 3D space.

Rendering system 100 may define (at 104) a tangent function, gradient function, smooth curve function, trigonometric function, and/or other non-linear function to model different resolutions or levels of detail at different planes or depths that provide at least one arc minute of resolvable detail in the final rendered image. Rendering system 100 may define (at 104) the non-linear function based on a mathematical model of human vision that maps one arc minute of resolvable detail to different onscreen resolutions, and that adjusts the model according to one or more of the resolution of display device 101, the size of display device 101, an expected distance of a viewer from display 101, and/or the positioning of the objects within the 3D space or 3D environment.

Rendering system 100 may render (at 106) the image data (e.g., the point cloud data points) to a produce image 103 on display device 101 with a gradually changing resolution or level of detail at different planes or depths that is computed by the non-linear function to mirror the visual acuity of human vision and/or to provide at least one arc minute of resolvable detail at each plane or depth of image 103. For instance, rendering system 100 may render (at 106) a first set of data points within one or more first planes 105 of image 103 at a first resolution or level of detail, a second set of data points within one or more second planes 107 of image 103 at a lower second resolution or level of detail, a third set of data points within one or more third planes 109 of image 103 at a third resolution or level of detail that is less than the second resolution or level of detail, and a fourth set of data points within fourth planes 111 of image 103 at a fourth resolution or level of detail that is less than the third resolution or level of detail. The specific resolution or level of detail computed for each of the one or more planes 105, 107, 109, and 111 using the non-linear function may provide at least one arc minute of resolvable detail. In other words, the resolution or level of detail at each of the one or more planes 105, 107, 109, and 111 is dynamically determined by adjusting the non-linear function according to one or more of the resolution of display device 101, the size of display device 101, an expected distance of a viewer from display 101, and/or the positioning of the objects within the 3D space or 3D environment. Accordingly, the resolution or level of detail at each plane 105, 107, 109, and 111 may dynamically change as image 103 is rendered on different display devices 101, and is not a fixed and/or predetermined resolution or level of detail for each plane 105, 107, 109, and 111.

Rendering system 100 may dynamically decimate the data points within the received file or point cloud in order to render the different planes of the image at the corresponding resolutions. In some embodiments, decimating the data points may include selecting some (e.g., a subset) or all data points within a given plane or depth to render, or may include rendering substitute or derived data points at a given plane or depth. For instance, rendering system 100 may define a substitute data point based on the positional elements and non-positional elements of two or more neighboring data points, and may render the substitute data point instead each of the two or more neighboring data points when rendering the corresponding plane of the image at the lowered resolution that still provides at least one arc minute of resolvable detail.

Figure 2:
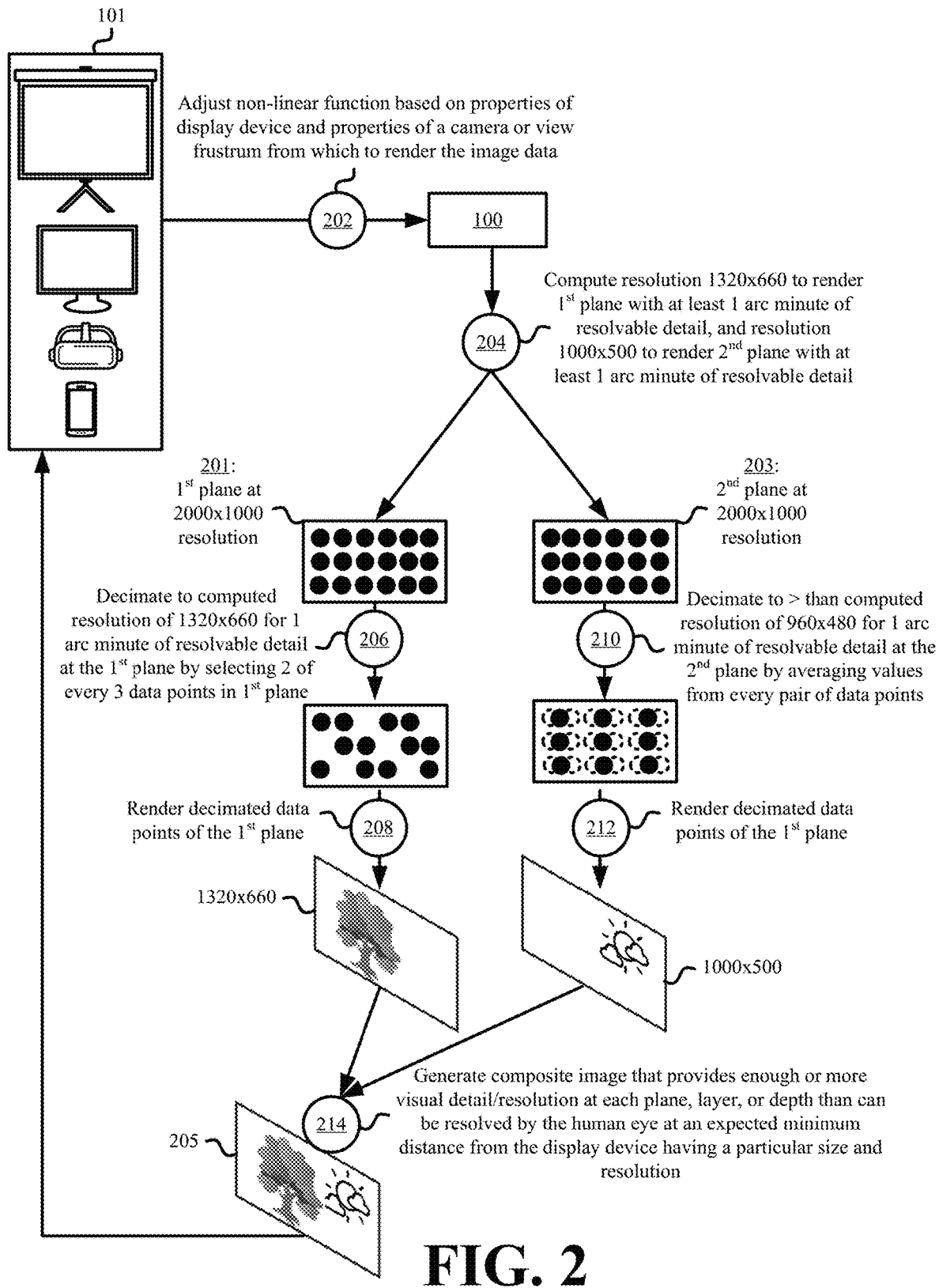
FIG. 2 illustrates an example of decimating data points in a first plane and a second plane in order to render the first and second planes with at least one arc minute of resolvable detail in accordance with some embodiments.

FIG. 2 illustrates an example of decimating data points in a first plane 201 and a second plane 203 in order to render the planes 201 and 203 with at least one arc minute of resolvable detail in accordance with some embodiments. Rendering system 100 may adjust (at 202) a non-linear function based on properties of display device 101 and a position, distance, orientation, and/or other properties of a camera or view frustum from which to render the image data within a point cloud or other image file.

Rendering system 100 may compute (at 204) different resolutions at which to render the image data that are at different planes or depths from the camera or view frustum in order to provide at least one arc minute of resolvable detail based on the adjusted non-linear function. For instance, rendering system 100 may compute (at 204) a first resolution that renders the data points of first plane 201 with at least one arc minute of resolvable detail based on the properties of display device 101 and the properties of the camera or view frustum from which the image data is rendered, and a different second resolution that renders the data points of second plane 203, some distance behind the first plane 201, with at least one arc minute of resolvable detail.

Planes 201 and 203 may include two or more planes of a 3D environment. In other words, first plane 201 may span a first range of one or more x-coordinate, y-coordinate, and z-coordinate values that the human eye is able to resolve with a first amount of visual acuity, and second plane 203 may span a second range of one or more x-coordinate, y-coordinate, and z-coordinate values that the human eye is able to resolve with a second amount of visual acuity. The received image data or point cloud may include additional planes of image data of data points that are not illustrated in FIG. 2 for purposes of simplicity.

Rendering system 100 may compare the resolution of a first set of data points in first plane 201 against the computed first resolution, and may compare the resolution of a second set of data points in second plane 203 against the computed second resolution in order to determine an amount of decimation for each plane 201 and 203. In some embodiments, the resolution or density of data points at the different planes or depths of the image (e.g., first plane 201 and second plane 203) may be consistent and/or the same. In some other embodiments, the resolution or density of data points at the different planes or depths of the image may vary depending on the amount of captured detail at each plane or depth.

If the resolution of the set of data points in a particular plane is less than or equal to the computed resolution required to provide at least one arc minute of resolvable detail, then rendering system 100 may preserve all the visual data in that particular plane and may render all of the set of data points in that particular plane. Otherwise, if the resolution of the set of data points in the particular plane is greater than the computed resolution required to provide at least one arc minute of resolvable detail, rendering system 100 may use one or more decimation techniques to reduce the number of data points or amount of data that are rendered to present the particular plane with at least one arc minute of resolvable detail.

As shown in FIG. 2, rendering system 100 may determine that the resolution of first plane 201 (e.g., 2000×1000) is 33% greater than the computed resolution for rendering first plane 201 with at least one arc minute of resolvable detail (e.g., 1320×660). Accordingly, rendering system 100 may decimate (at 206) first plane 201 by selecting two of every three data points in first plane 201, and by rendering (at 208) the selected data points in first plane 201 in order to reduce the resources and time to render first plane 201 with at least one arc minute of resolvable detail.

Rendering system 100 may determine that the resolution of second plane 203 (e.g., 2000×1000) is more than 50% greater than the computed resolution for rendering second plane 203 with at least one arc minute of resolvable detail (e.g., 960×480). Rather than decimate second plane 203 to exactly match the computed resolution for second plane 203, rendering system 100 may determine that it is more efficient to use a decimation technique that reduces the amount of data or the number of data points that are to be rendered in second plane 203 by half (e.g., 1000×500) rather than the lower computed resolution of 960×480 for second plane 203. Specifically, rendering system 100 may decimate (at 210) second plane 203 by defining a new data point for every pair of data points in second plane 203 to have positional elements and non-positional elements that are averaged from the positional elements and the non-positional elements from the pair of data points being replaced by the newly defined data point. Accordingly, rendering system 100 may use different decimation techniques to lower or modify the resolution of data points at each plane 201 and 203 differently, and to better preserve the visual detail at each plane 201 and 203. Rendering system 100 may render (at 212) the decimated data points of second plane 203 to present a visualization of second plane 203 with at least one arc minute of resolvable detail.

Rendering system 100 may generate (at 214) composite image 205 based on the decimated data points rendered at each plane, layer, or depth. Generating (at 214) composite image 205 may include presenting composite image 205 on display device 101 such that the varying resolutions at the different planes, layers, or depths of composite image 205 combined with the resolution and size of display device 101 provide enough or more visual detail at each plane, layer, or depth than can be resolved by the human eye at an expected minimum viewing distance from display device 101.

In some embodiments, the point cloud data points or image data representing a 3D environment may be organized in a tree structure. The leaf nodes of the tree may correspond to the individual data points and/or the highest resolution at which the 3D environment may be rendered. The parent node at each tier removed from the leaf nodes provides a lower resolution render of the leaf nodes under that parent node. For instance, each parent node may include a single set of positional elements and non-positional elements to represent the positional elements and non-positional elements of two or more leaf nodes or data points under that parent node.

Rendering system 100 may apply the non-linear function and different decimation techniques to the tree-based representation of the data points or image data, and/or to further reducing resources and time to render an image with varying resolutions that provide at least one arc minute of resolvable detail at different layers, planes, or depth of the image on a display device with a specific screen size and resolution that is viewed from a particular distance. Specifically, rather than decimate the image data at the time of rendering, the tree-based representation may include the image data and different decimated representations of that data at each tier or level that is removed from the leaf nodes. In other words, the parent nodes at each layer of the tree-based representation may represent decimated image data for different regions within different planes, depths, or layers of the 3D environment, and may contain a single set of positional and non-positional elements for the decimated image data in those regions. Accordingly, rendering system 100 may use the non-linear function to determine the level of detail for a particular region at a particular plane, depth, or layer of the 3D environment, may locate the one or more nodes at the highest tier in the tree-based structure that includes image data for that particular region at the level of detail or a greater level of detail, and may render the image data contained within the one or more nodes.

Figure 3:
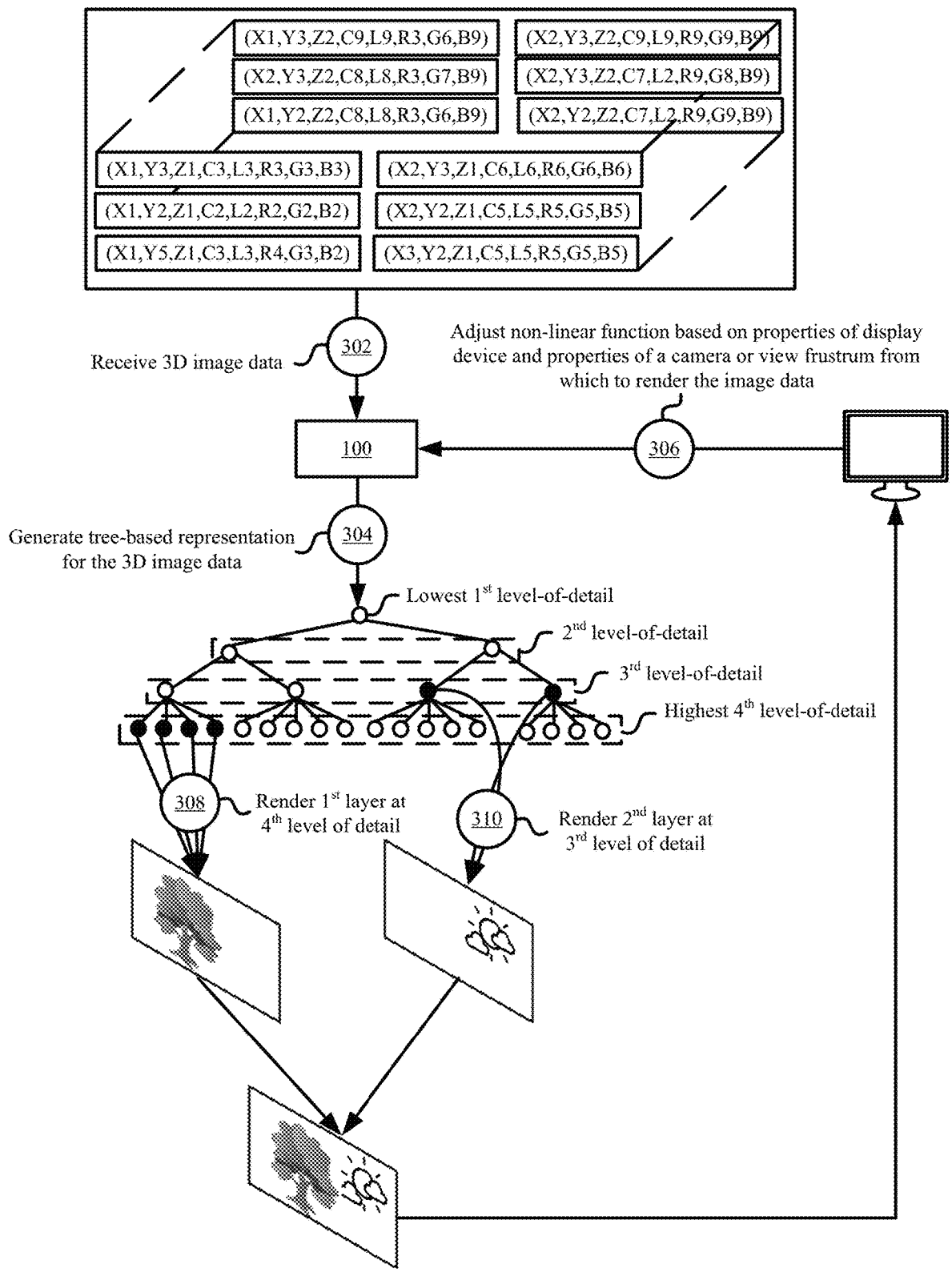
FIG. 3 illustrates an example of dynamically rendering a three-dimensional ("3D") environment with varying detail that emulates human vision based on different traversals of a tree-based representation of image data in accordance with some embodiments presented herein.

FIG. 3 illustrates an example of dynamically rendering a 3D environment with varying detail that emulates human vision based on different traversals of a tree-based representation of image data in accordance with some embodiments presented herein. As shown in FIG. 3, rendering system 100 may receive (at 302) image data that captures a 3D environment.

Rendering system 100 may generate (at 304) a tree-based structure to represent the image data of the 3D environment. In some embodiments, the tree-based structure may organize the data points or image data according to their z-depth positioning. In some embodiments, rendering system 100 may determine the position and orientation of a camera or view frustum from which to render the 3D environment, and may organize the data points or the image data according to their distance from the camera or the view frustum. In some embodiments, a different tree-based structure may be generated (at 304) for each layer, plane, or depth or different sets of layers, planes, or depths from the camera or view frustum. The leaf nodes may represent the 3D environment at full resolution. Each tier above the leaf nodes may represent the 3D environment at a progressively lower resolution by using a parent node to represent the positional and non-position elements of two or more children nodes. For instance, the parent node may include a single set of values that are selected, computed, and/or otherwise derived (e.g., average, median, etc.) from the values of the positional and non-positional elements of the two or more children nodes.

Rendering system 100 may adjust (at 306) a non-linear function that models visual acuity of human vision based on the properties of the display device being used to present the visualization of the 3D environment, and further based on the properties of a camera or view frustum from which to render the 3D environment. The properties of the display device may include one or more of the screen resolution, screen size, and distance of the viewer from the display device. The properties of the camera or view frustum may be defined by determining a distance between the camera and each rendered layer of the 3D environment, and/or mapping each distance to a measure or scale used by the non-linear function to model the visual acuity of human vision. For instance, rendering system 100 may convert a z-depth distance at which a particular object in the 3D environment is rendered to a distance in meters between the particular object and the camera.

Rendering system 100 may use the adjusted non-linear function to determine the resolution or level of detail at which to render data points at different layers, planes, and/or depths of the 3D environment. For instance, rendering system 100 may render (at 308) a first set of data points at a first layer of the 3D environment or at a first distance from the camera with the highest first level of detail. In other words, rendering system 100 may render (at 308) each of the first set of data points according to the positional and non-positional elements for each leaf node in the tree-based structure that is defined for each data point of the first set of data points. Rendering system 100 may render (at 310) a second set of data points at a second layer of the 3D environment or at a second distance from the camera with the lower second level of detail. The second level of detail corresponds to one or more parent nodes in the tree-based structure that each have a single set of values that represent the positional elements and the non-positional elements for two or more of the second set of data points. As shown in FIG. 3, rendering system 100 may render (at 310) two parent nodes instead of nine leaf nodes representing a different data point of the second set of data points. Specifically, rendering system 100 may traverse down from the root node of the tree-based structure towards the leaf nodes representing the second set of nodes until arriving at a tier and/or parent nodes in tree-based structure with a resolution or level of detail that matches or exceeds the computed resolution or resolution for that layer, depth, or plane of the 3D environment.

Figure 4:
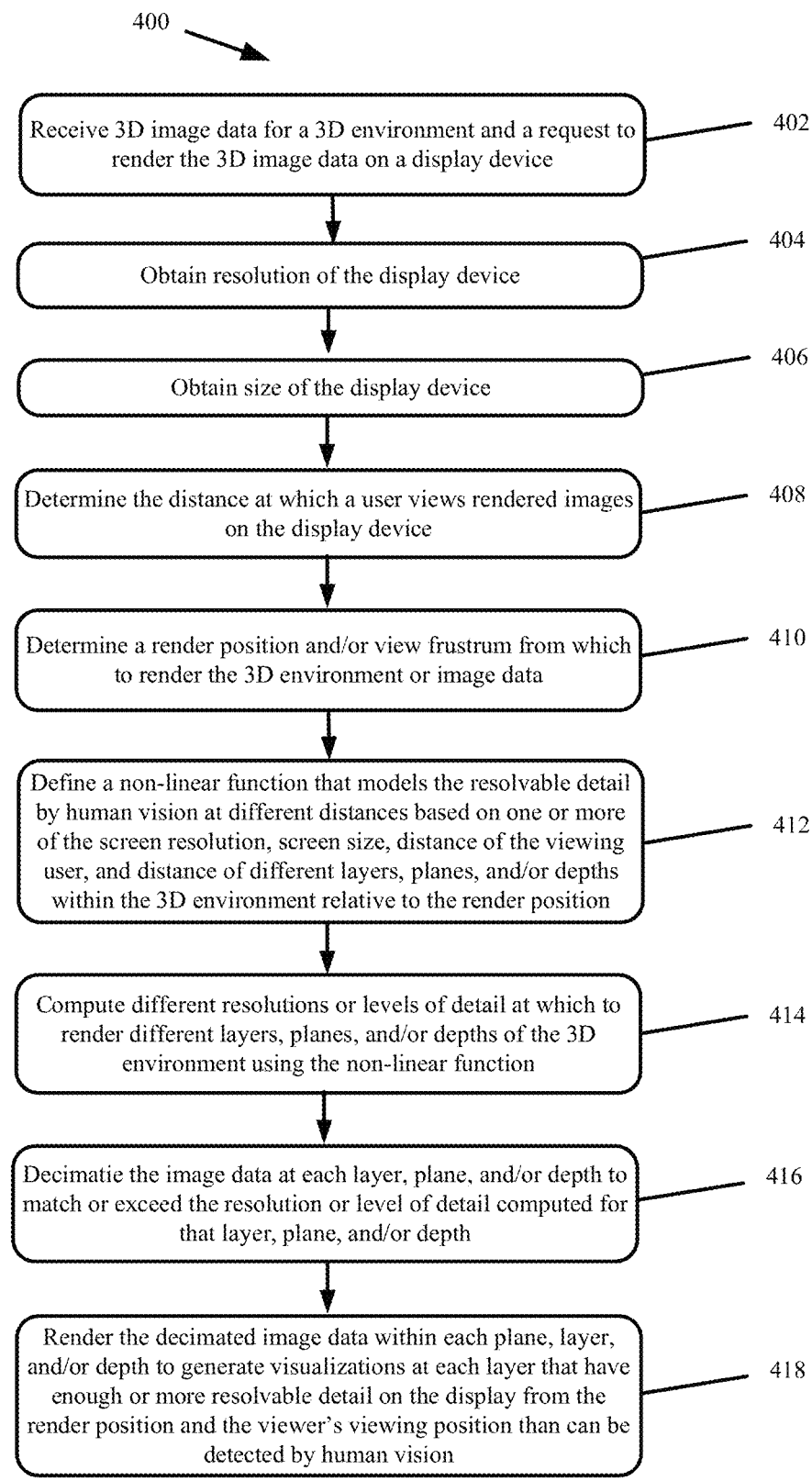
FIG. 4 presents a process for dynamically determining a resolution or level of detail at which to render different layers, planes, and/or depths of an image with at least one arc minute of resolvable detail in accordance with some embodiments presented herein.

FIG. 4 presents a process 400 for dynamically determining a resolution or level of detail at which to render different layers, planes, and/or depths of an image with at least one arc minute of resolvable detail in accordance with some embodiments presented herein. Process 400 may be implemented by rendering system 100. Rendering system 100 may include one or more devices that process, edit, render, and/or otherwise present images of a 3D environment, point cloud, and/or file containing image data. Rendering system 100 may further include user interfaces ("UIs") and application programming interfaces ("APIs") for controlling the processing, editing, rendering, and/or presentation of the images.

Process 400 may include receiving (at 402) 3D image data and a request to render the 3D image data on a particular display. The 3D image data may be stored in one or more files, and may represent a 3D capture of a 3D environment or a digitally created 3D environment. The 3D image data may be stored as a point cloud with a plurality of data points or as set of polygons, meshes, and/or 3D constructs that collectively form the 3D environment. In some embodiments, the 3D image data may be structured as a binary tree, octree, k-dimensional ("KD") tree, and/or another tree-based structure with different layers of the tree comprising nodes that contain the image data at different levels of detail.

Process 400 may include obtaining (at 404) a resolution and obtaining (at 406) a size of the display on which the image will be rendered and/or presented. Rendering system 100 may query the operating system, graphics driver, and/or other components of the device that is used to present the image to determine the display resolution and display size. In some embodiments, the display resolution and size may be stored in a configuration file that is read by rendering system 100, or may be provided as input to rendering system 100 by an application, user, or device.

Process 400 may include determining (at 408) the distance at which a user views rendered images on the display. In some embodiments, rendering system 100 may use a depth camera, imaging camera, and/or other sensor to determine (at 408) the viewer's distance from the display. In some embodiments, rendering system 100 may estimate a minimum distance of the viewer from the display based on the resolution and/or size of the display. For instance, a viewer may be estimated to be a first distance from a screen of a first size and a first resolution, and a second distance from a screen of a second size and a second resolution. In some embodiments, rendering system 100 may be configured with different viewer distances for different display devices. For instance, rendering system 100 may be configured with a viewer distance of six inches when the display device is a virtual reality or augmented reality headset, two feet for a computer monitor of a first size and first resolution, and ten feet for a television set of a second size and second resolution.

Process 400 may include determining (at 410) a render position from which to render the 3D environment or image data. Determining (at 410) the render position may include defining the view frustum based on a position and orientation of a virtual camera placed within the representation of the 3D environment. Determining (at 410) the render position may include computing a distance between the layers, planes, and/or depths of the 3D environment and the rendering position. For instance, the camera may be set at a render position that is a virtual one foot of distance from a first object in a first plane, and a virtual ten feet of distance from a second object in a second more distance plane.

Process 400 may include defining (at 412) a non-linear function that models the resolvable detail by human vision at different distances based on one or more of the screen resolution, screen size, distance of the viewing user, and distance of objects or points at different layers, planes, and/or depths within the 3D environment relative to the render position. In some embodiments, the non-linear function may be defined (at 412) to compute the resolution that equates to at least one arc minute of resolvable detail at the different layers, planes, and/or depths of the 3D environment that are rendered from the specified camera position and viewed on a display with the specified resolution and size from the expected viewing distance. In some embodiments, the non-linear function may include a tangent function, a gradient function, a smooth curve function, and/or another function that models gradually decreasing resolvable resolution of human vision at different distances that correspond to the different rendered layers, planes, and/or depths of the 3D environment.

An example non-linear function may include:

$$\text{Point pitch} = 1/(2*d*\text{Tan}(\Theta/2)) \quad (1)$$

"d" may represent the viewer's distance to the display or screen. "Θ" may represent the viewing angle for the highest or desired frequency of detail. For instance, "Θ" may have a value equal to $\frac{1}{60}^{th}$ of a degree or one arc minute. The point pitch may represent the maximum perceivable resolution. Accordingly, if the one arc minute of resolvable detail is desired and the viewer's distance is 700 millimeters, then the example non-linear function (1) may output a point pitch of 4.911 points per millimeter for objects at the screen plane or near frustum. Objects rendered further away may be rendered at a lower point pitch or level of detail by adjusting the viewer's distance according to the virtual distance for different objects in different planes or depths of the 3D environment. In some embodiments, the example non-linear function (1) may be adjusted to include variables for the display size and/or the maximum display resolution.

Process 400 may include computing (at 414) different resolutions or levels of detail at which to render different layers, planes, and/or depths of the 3D environment using the non-linear function. Specifically, the non-linear function may output a resolution or level of detail for one or more different layers, planes, and/or depths so that features, surfaces, articles, and/or objects in each layer, plane, or depth are rendered with enough or more resolvable detail on the display (e.g., display with a particular size and resolution) from the render position and the viewer's viewing position than is detected by human vision (e.g., a resolution or level of detail that is equal to greater than one arc minute of resolvable detail). For computational efficiency, rendering system 100 may compute (at 414) and/or use the same resolution for two or more planes when the distance between adjacent planes in the 3D environment or 3D space is less than a threshold distance.

Process 400 may include decimating (at 416) the image data at each layer, plane, and/or depth to match or exceed the resolution or level of detail computed for that layer, plane, and/or depth. Decimating (at 416) the image data may include selecting different image data at each layer, plane, and/or depth to render, or defining less image data to represent the features, surfaces, articles, and/or objects in a layer, plane, and/or depth at the computed resolution or level of detail than originally provided for that layer, plane, and/or depth in the image file or image data. In some embodiments, rendering system 100 may decimate a set of data points in a layer so that resolution or level of detail across that layer is consistent. For instance, the layer may include a first concentration of data points that represent a first object at an 800×600 resolution and a second concentration of data points that represent a second object at an 640×480 resolution, and the computed resolution for that layer maybe 600×400. In this case, rendering system may decimate the first object so that it is represented at the 600×400 resolution, and may retain the second object at the original 640×480 resolution or decimate the second object to the 600×400 resolution so that the different objects in the layer are more consistently represented at the computed resolution for the layer.

Process 400 may include rendering (at 418) the decimated image data (e.g., decimated data points, polygons, meshes, and/or other 3D constructs) within each plane, layer, and/or depth to generate visualizations at each layer that have enough or more resolvable detail on the display from the render position and the viewer's viewing position than can be detected by human vision. Accordingly, rendering system 100 may generate an image with a gradually decreasing resolution that provides objects or rendered points at different distances or positions within the view frustum with at least one arc minute of resolvable detail.

In some embodiments, rendering system 100 may recompute the different resolutions or levels of detail for the different planes, layers, and/or depths as the render position or view frustum changes within the 3D environment. For instance, if the render position is moved further back, the visualizations at each plane, layer, or depth of the images may be further reduced in quality to match the resolvable detail of human vision. Similarly, if the render position is moved closer and/or towards the rendered objects, then rendering system 100 may increase the quality of the objects by increasing their resolution, detail, and/or the image data used to render each object.

Figure 5:
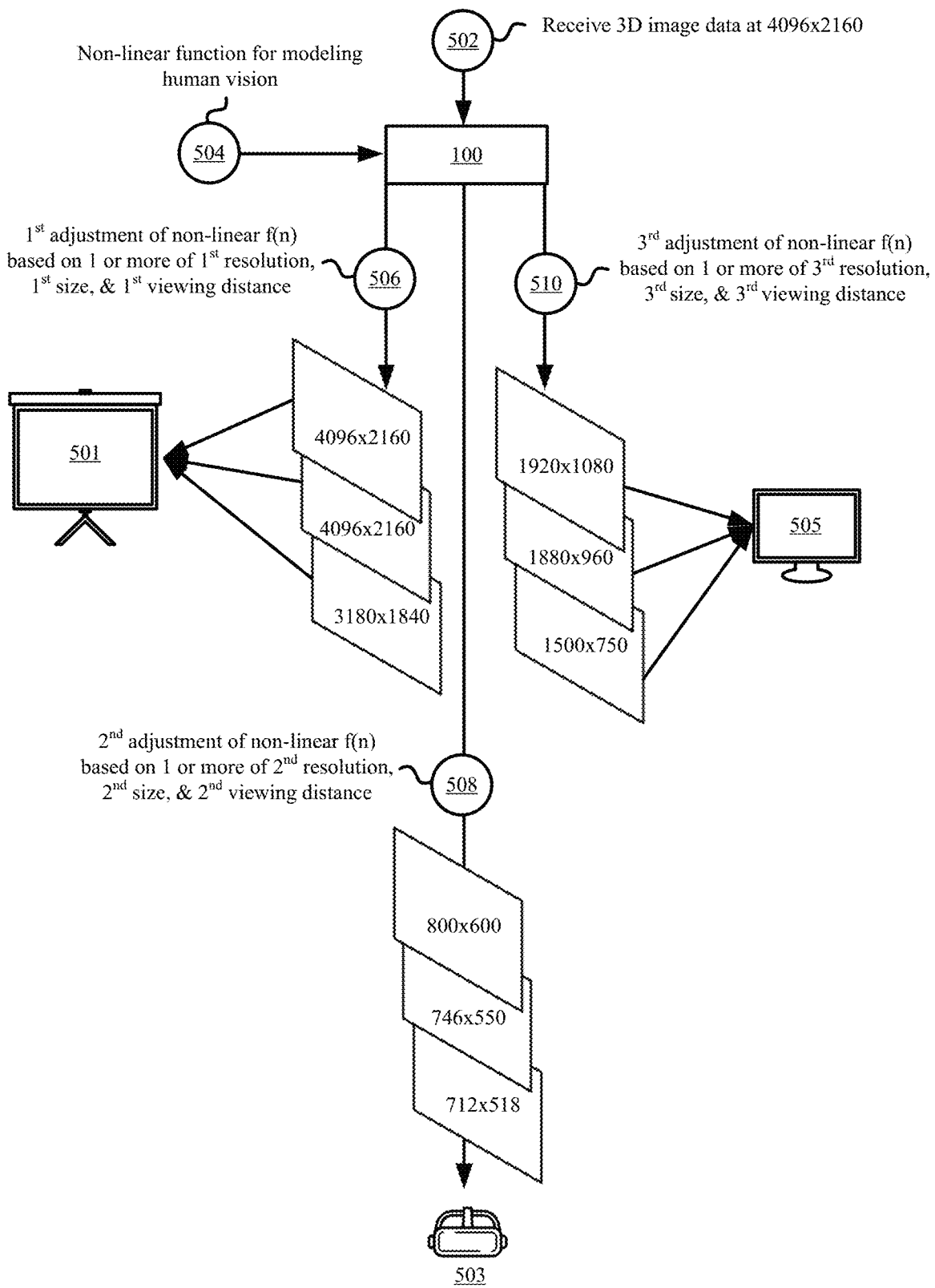
FIG. 5 illustrates an example of using the non-linear function to render different planes of the same image with different resolutions on different display devices, display resolutions, and/or viewing distances in accordance with some embodiments presented herein.

FIG. 5 illustrates an example of using the non-linear function to render different planes of the same image with different resolutions on different display devices, display resolutions, and/or viewing distances in accordance with some embodiments presented herein. As shown in FIG. 5, rendering system 100 may receive (at 502) image data for a 3D environment at a first resolution.

Rendering system 100 may select (at 504) a non-linear function that models resolvable detail that human vision detects at different depths of an image rendered on a display of a particular size and resolution when viewed from a particular viewing distance. Rendering system 100 may perform (at 506) a first adjustment of the non-linear function based on one or more of a first screen size, first screen resolution, and/or first viewing distance associated with first display device 501, and may render different planes of the image at a first set of resolutions determined based on the first adjustment to the non-linear function. Rendering system 100 may perform (at 508) a second adjustment of the non-linear function based on one or more of a second screen size, second screen resolution, and/or second viewing distance associated with second display device 503, and may render different planes of the image at a second set of resolutions determined based on the second adjustment to the non-linear function. Rendering system 100 may perform (at 510) a third adjustment of the non-linear function based on one or more of a third screen size, third screen resolution, and/or third viewing distance associated with third display device 505, and may render different planes of the image at a third set of resolutions determined based on the third adjustment to the non-linear function.

In some embodiments, the non-linear function may output various adjustments to non-positional elements of the data points based on the planes, layers, and/or depths at which those data points are to be rendered. The non-linear function may compute these adjustments in order to realistically replicate how human vision perceives contrast, chrominance, luminance, saturation, RGB color values, and/or other non-positional elements at different depths or distances. For instance, the non-linear function may specify leaving RGB color values unadjusted for objects rendered in a frontmost plane, reducing the RGB color values by 10% for objects that are a virtual ten feet from the frontmost plane, and reducing the RGB color values by 25% for objects that are a virtual 15 feet or more from the frontmost plane.

In some embodiments, the non-linear function may be adjusted to realistically replicate different impacts that fog, mist, light, shadows, conditions associated with impaired vision (e.g., myopia, hyperopia, astigmatism, macular degeneration, cataracts, etc.), and/or other effects have on the visualizations at different layers, planes, and/or depths of the final rendered image. Each effect may be associated with different changes to the non-linear function that alter the visibility of different data points at different distances. The changes may be made to the resolution or level of detail at each plane as well as to the non-positional elements of the data points or image data rendered at each plane.

Figure 6:
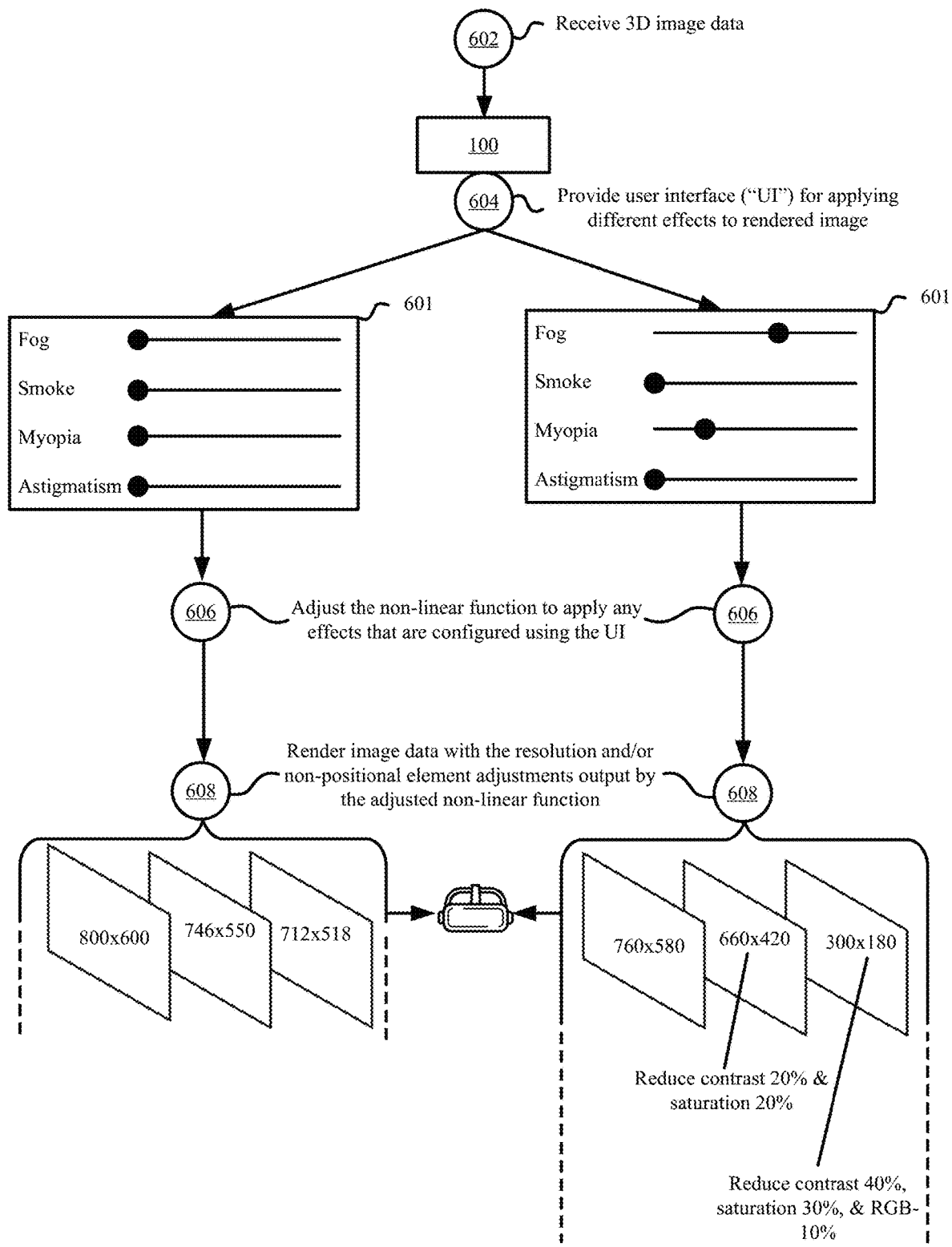
FIG. 6 illustrates an example of using the non-linear function to define different effects that modify the resolution and non-positional elements of different objects rendered at different depths within a rendered image in accordance with some embodiments presented herein.

FIG. 6 illustrates an example of using the non-linear function to define different effects that modify the resolution and non-positional elements of different objects rendered at different depths within a rendered image in accordance with some embodiments presented herein. Rendering system 100 may receive (at 602) image data for a 3D environment, and may provide (at 604) UI 601 for defining different effects to apply when rendering the image data. UI 601 may include selectable elements for applying different effects to the rendered image, and different interactive sliders for setting the impact of each selected effect.

Rendering system 100 may adjust (at 606) the non-linear function according to the display resolution, display size, viewing distance, and/or any effects that are configured using UI 601. Rendering system 100 may use the adjusted non-linear function to determine different resolutions and/or non-positional element adjustments to apply to different layers, planes, and/or depths of the image, and may render (at 608) each layer, plane, and/or depth with the resolution and/or non-positional element adjustments output by the adjusted non-linear function. As shown in FIG. 6, the image is rendered on the same display device with different resolutions and different adjustments to the non-positional elements of the image data at different layers, planes, and/or depths of the image as a result of different effects being applied using the UI 601.

Figure 7:
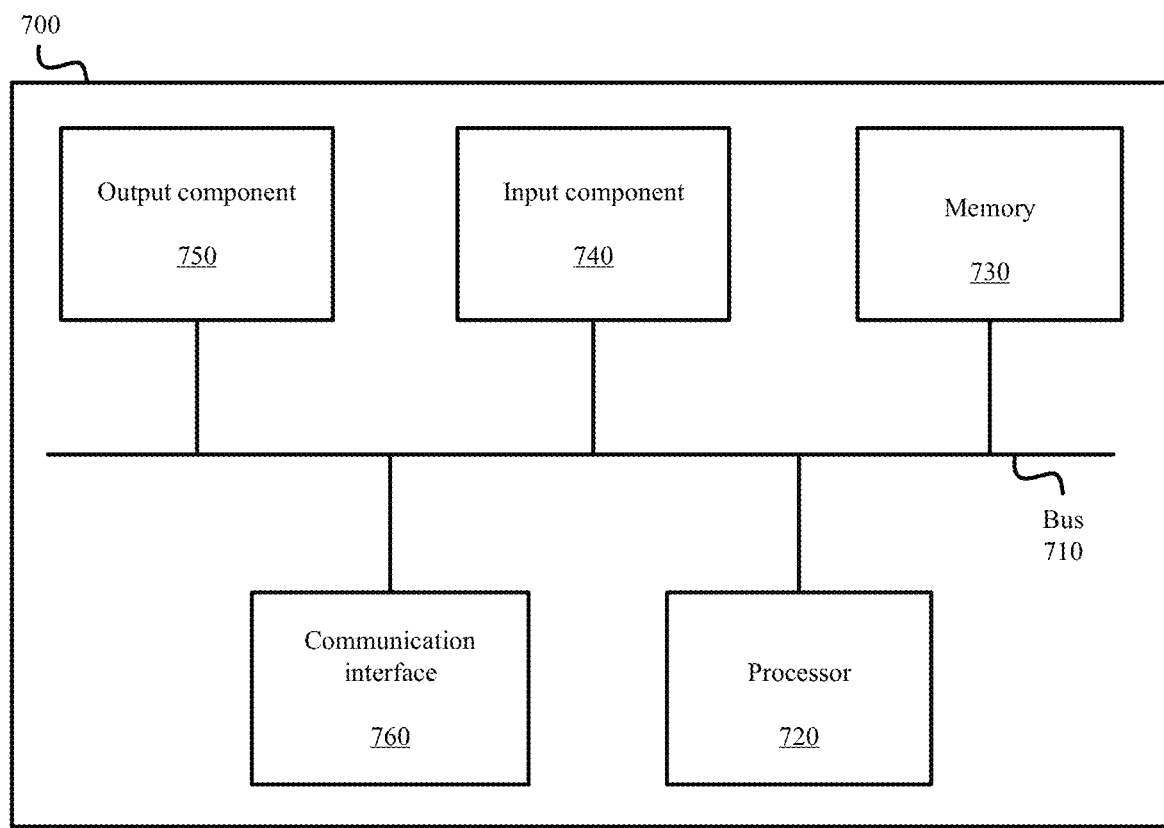
FIG. 7 illustrates example components of one or more devices, according to one or more embodiments described herein.

FIG. 7 is a diagram of example components of device 700. Device 700 may be used to implement one or more of the devices or systems described above (e.g., rendering system 100, display devices 101, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a plurality of image data that is defined at different positions in a three-dimensional ("3D") space and that represents a 3D environment;
defining a view frustum as a particular volume in the 3D space that spans between a first depth and a second depth of the 3D space;
modeling a first amount of resolvable detail at the first depth of the view frustum, wherein modeling the first amount of resolvable detail comprises adjusting a first value derived from the first depth by a second value derived from one or more of a size of a display, a resolution of the display, or a viewer distance from the display;
modeling a second amount of resolvable detail at the second depth of the view frustum, wherein modeling the second amount of resolvable detail comprises adjusting a third value derived from the second depth by the second value;
rendering a first set of the plurality of image data with positions in the 3D space that are at the first depth and in the particular volume at a first resolution that presents the first depth of the view frustum with the first amount of resolvable detail; and
rendering a second set of the plurality of image data with positions in the 3D space that are at the second depth and in the particular volume at a second resolution that presents the second depth of the view frustum with the second amount of resolvable detail, wherein the first resolution is different than the second resolution.

2. The method of claim 1 further comprising:
generating a visualization of the 3D environment by combining the rendering of the first set of image data at the first resolution with the rendering of the second set of image data at the second resolution.

3. The method of claim 1, wherein the first resolution is greater than the second resolution.

4. The method of claim 1 further comprising:
rendering, at a third resolution, a third set of the plurality of image data with positions in the 3D space corresponding to a third depth that is in between the first depth and the second depth, and wherein the third resolution is greater than the second resolution and less than the first resolution.

5. The method of claim 1 further comprising:
dynamically determining the first resolution at which to render image data at the first depth based on a first distance from the first depth to a viewing position, wherein the viewing position is determined from the one or more of the size of the display, the resolution of the display, or the viewer distance from the display; and
dynamically determining the second resolution at which to render image data at the second depth based on a second distance from the second depth to the viewing position.

6. The method of claim 1 further comprising:
dynamically determining the first resolution at which to render image data at the first depth based on a first size at which to present the first set of image data at the first depth on a display of a specific size; and
dynamically determining the second resolution at which to render image data at the second depth based on a second size at which to present the second set of image data at the second depth on the display of the specific size.

7. The method of claim 1,
wherein receiving the plurality of image data comprises receiving a 3D file with the plurality of image data encoded at a common resolution at the different positions in the 3D space;
wherein rendering the first set of image data at the first resolution comprises rendering the first set of image data at the common resolution; and
wherein rendering the second set of image data at the second resolution comprises rendering the second set of image data at the second resolution that is less than a common resolution.

8. The method of claim 1 further comprising:
dynamically determining the first resolution that presents the first set of image data at the first depth with the first amount of resolvable detail, wherein the first amount of resolvable detail corresponds to one arc minute of resolvable detail at the first depth of the view frustum; and
dynamically determining the second resolution that presents the second set of image data at the second depth with the second amount of resolvable detail, wherein the second amount of resolvable detail corresponds to one arc minute of resolvable detail at the second depth of the view frustum.

9. The method of claim 1 further comprising:
dynamically determining the first resolution based on a non-linear function that is configured for the first depth; and
dynamically determining the second resolution based on the non-linear function that is configured for the second depth.

10. The method of claim 1 further comprising:
changing the view frustum from a closer first position to a more distance second position;
determining that the first set of image data is at a third depth in the particular volume of the view frustum as a result of changing the view frustum; and
rendering the first set of image data at a third resolution that is less than the first resolution in response to the changing of the view frustum.

11. The method of claim 1 further comprising:
decreasing the first resolution and the second resolution in response to a distance between a particular position at which the 3D environment is rendered and the first and second sets of image data increasing; and
increasing the first resolution and the second resolution in response to the distance between the particular position at which the 3D environment is rendered and the first and second sets of image data decreasing.

12. A system comprising:
one or more hardware processors configured to:
receive a plurality of image data that is defined at different positions in a three-dimensional ("3D") space and that represents a 3D environment;
define a view frustum as a particular volume in the 3D space that spans between a first depth and a second depth of the 3D space;
model a first amount of resolvable detail at the first depth of the view frustum, wherein modeling the first amount of resolvable detail comprises adjusting a first value derived from the first depth by a second value derived from one or more of a size of a display, a resolution of the display, or a viewer distance from the display;
model a second amount of resolvable detail at the second depth of the view frustum, wherein modeling the second amount of resolvable detail comprises adjusting a third value derived from the second depth by the second value;
render a first set of the plurality of image data with positions in the 3D space that are at the first depth and in the particular volume at a first resolution that presents the first depth of the view frustum with the first amount of resolvable detail; and
render a second set of the plurality of image data with positions in the 3D space that are at the second depth and in the particular volume at a second resolution that presents the second depth of the view frustum with the second amount of resolvable detail, wherein the first resolution is different than the second resolution.

13. The system of claim 12, wherein the one or more hardware processors are further configured to:
generate a visualization of the 3D environment by combining the rendering of the first set of image data at the first resolution with the rendering of the second set of image data at the second resolution.

14. The system of claim 12, wherein the one or more hardware processors are further configured to:
render, at a third resolution, a third set of the plurality of image data with positions in the 3D space corresponding to a third depth that is in between the first depth and the second depth, and wherein the third resolution is greater than the second resolution and less than the first resolution.

15. The system of claim 12, wherein the one or more hardware processors are further configured to:
dynamically determine the first resolution at which to render image data at the first depth based on a first distance from the first depth to a viewing position, wherein the viewing position is determined from the one or more of the size of the display, the resolution of the display, or the viewer distance from the display; and
dynamically determine the second resolution at which to render image data at the second depth based on a second distance from the second depth to the viewing position.

16. The system of claim 12 wherein the one or more hardware processors are further configured to:
dynamically determine the first resolution at which to render image data at the first depth based on a first size at which to present the first set of image data at the first depth on a display of a specific size; and
dynamically determine the second resolution at which to render image data at the second depth based on a second size at which to present the second set of image data at the second depth on the display of the specific size.

17. The system of claim 12, wherein the one or more hardware processors are further configured to:
dynamically determine the first resolution that presents the first set of image data at the first depth with the first amount of resolvable detail, wherein the first amount of resolvable detail corresponds to one arc minute of resolvable detail at the first depth of the view frustum; and
dynamically determine the second resolution that presents the second set of image data at the second depth with the second amount of resolvable detail, wherein the second amount of resolvable detail corresponds to one arc minute of resolvable detail at the second depth of the view frustum.

18. The system of claim 12, wherein the one or more hardware processors are further configured to:
- dynamically determine the first resolution based on a non-linear function that is configured for the first depth; and
- dynamically determine the second resolution based on the non-linear function that is configured for the second depth.

19. A non-transitory computer-readable medium storing program instructions that, when executed by one or more hardware processors of a rendering system, cause the rendering system to perform operations comprising:
- receive a plurality of image data that is defined at different positions in a three-dimensional ("3D") space and that represents a 3D environment;
- define a view frustum as a particular volume in the 3D space that spans between a first depth and a second depth of the 3D space;
- model a first amount of resolvable detail at the first depth of the view frustum, wherein modeling the first amount of resolvable detail comprises adjusting a first value derived from the first depth by a second value derived from one or more of a size of a display, a resolution of the display, or a viewer distance from the display;
- model a second amount of resolvable detail at the second depth of the view frustum, wherein modeling the second amount of resolvable detail comprises adjusting a third value derived from the second depth by the second value;
- render a first set of the plurality of image data with positions in the 3D space that are at the first depth and in the particular volume at a first resolution that presents the first depth of the view frustum with the first amount of resolvable detail; and
- render a second set of the plurality of image data with positions in the 3D space that are at the second depth and in the particular volume at a second resolution that presents the second depth of the view frustum with the second amount of resolvable detail, wherein the first resolution is different than the second resolution.

* * * * *